(12) United States Patent
Brevick et al.

(10) Patent No.: US 6,688,272 B2
(45) Date of Patent: Feb. 10, 2004

(54) CRANKSHAFT ASSEMBLY FOR ENABLING ENGINE CYLINDER DEACTIVATION

(75) Inventors: John Edward Brevick, Livonia, MI (US); Alvin Henry Berger, Brownstown, MI (US); Sherry Renee Lopez, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,956

(22) Filed: May 29, 2002

(65) Prior Publication Data

US 2003/0221653 A1 Dec. 4, 2003

(51) Int. Cl.⁷ .................................. F16C 3/20
(52) U.S. Cl. ..................... 123/192.2; 74/604
(58) Field of Search .................. 123/192.1, 192.2; 74/604

(56) References Cited

U.S. PATENT DOCUMENTS

| | | | | |
|---|---|---|---|---|
| 2,239,111 A | * | 4/1941 | Moore | 74/604 |
| 2,272,189 A | * | 2/1942 | De Pew | 74/604 |
| 2,332,072 A | * | 10/1943 | Gregory et al. | 74/604 |
| 2,352,908 A | * | 7/1944 | Moore | 384/220 |
| 2,378,592 A | * | 6/1945 | Specht | 74/604 |
| 2,540,880 A | * | 2/1951 | Hey et al. | 74/604 |
| 2,584,384 A | * | 2/1952 | Galliers | 74/604 |
| 2,875,742 A | * | 3/1959 | Dolza | 123/198 F |
| 4,070,971 A | | 1/1978 | Studebaker | |
| 4,433,657 A | | 2/1984 | Levinson | |
| 4,556,026 A | | 12/1985 | Masuda et al. | |
| 4,608,952 A | | 9/1986 | Morita et al. | |
| 6,026,776 A | * | 2/2000 | Winberg | 123/192.1 |

* cited by examiner

Primary Examiner—Noah P. Kamen

(57) ABSTRACT

A crankshaft assembly (18) for a VDIC engine (16) of an automotive vehicle (14) includes a crankshaft (44) integrated within an internal combustion engine (16). The crankshaft (44) has at least two pendulum vibration absorber assemblies (58) integrated therein. Each pendulum vibration absorber assembly (58) includes a counterweight member (60) integrally formed within the crankshaft (44). The counterweight member (60) has a desired counterweight mass for providing, in conjunction with the mass of the assembly (58), first order engine balance. The counterweight member (60) has a pendulum (64) pivotally coupled thereto. The pendulum (64) has a desired mass and geometry for attenuating torsional fluctuation.

15 Claims, 14 Drawing Sheets

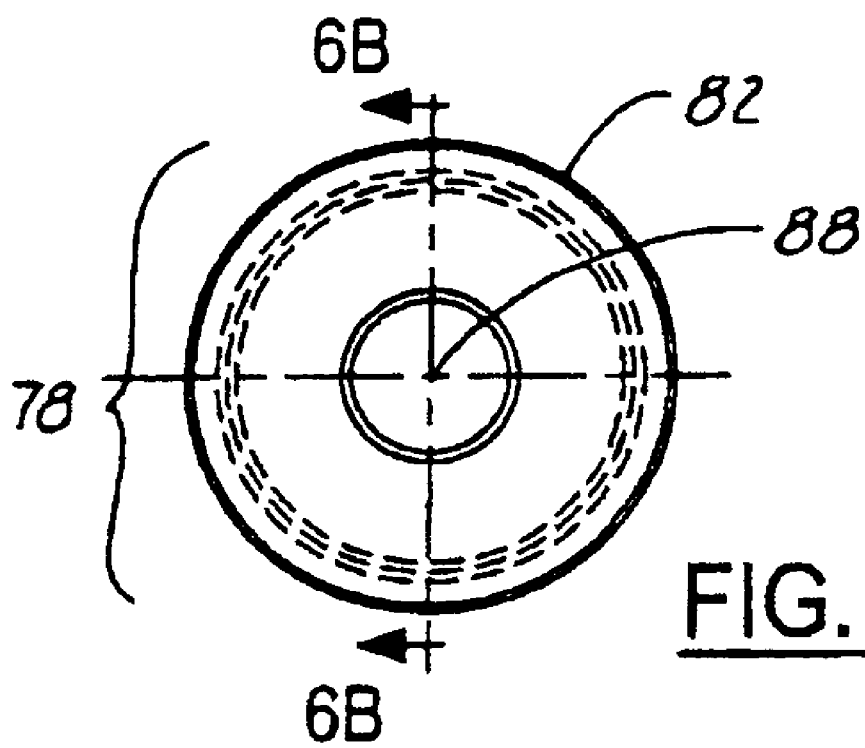

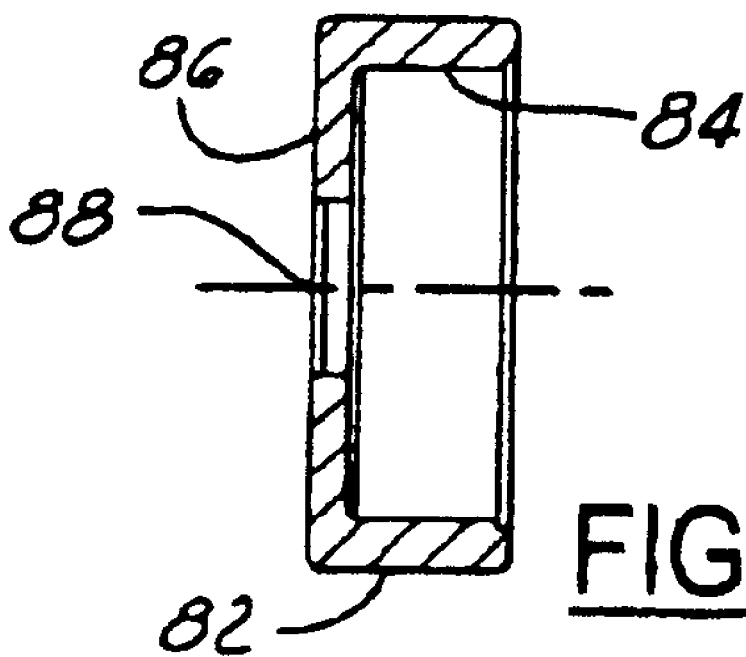

CRANKSHAFT ASSEMBLY FOR ENABLING ENGINE CYLINDER DEACTIVATION

BACKGROUND OF INVENTION

The present invention relates generally to internal combustion engines for automotive vehicles, and more particularly to crankshaft assemblies integrated within variable displacement internal combustion engines (VDIC engines) of automotive vehicles.

Variable displacement internal combustion engines (VDIC engines) are known for improving fuel economy by reducing the amount of functioning displacement when vehicles require less power. The amount of functioning displacement is typically reduced by disabling the valves associated with at least one cylinder.

For example, a vehicle having an eight cylinder VDIC engine may derive sufficient power for idle operation conditions from four of its cylinders. The VDIC engine may disable valves associated with four of its cylinders. The reduction in functional displacement consequently reduces the power supplied by the engine, so that to maintain the same idle speed in the four-cylinder mode that the engine had in the eight-cylinder mode, the absolute pressure in the intake manifold is increased. The corresponding decrease in the pressure drop across the throttle plate results in an improvement in the engine's operating efficiency. The engine may be quickly returned to eight-cylinder operation, when the accelerator is pressed to the floor for maximum acceleration. Thus, the VDIC engine improves fuel economy without sacrificing needed power.

FIG. 1 is a graphic illustration of a typical crankshaft torque output of an eight-cylinder, four-stroke VDIC engine operating during a full displacement mode 10 and a reduced displacement mode 12.

A reduced displacement operation curve 12 represents torque experienced by a crankshaft of the VDIC engine during a reduced displacement operation. For instance, in reduced displacement operation of the eight-cylinder engine the valves associated with four of the cylinders are deactivated. By disabling some of the cylinders, one skilled in the art would understand that the frequency of torque pulses is likewise reduced. The magnitude of the torque pulses during reduced displacement operation is necessarily higher than the magnitude of the torque pulses during full displacement operation to provide approximately equal mean torque output.

The increased magnitude and decreased frequency of torque pulses during reduced displacement operation typically result in unacceptable noise, vibration, and harshness (NVH) levels within the vehicle. In general, NVH levels are within an acceptable range during full displacement operation of the VDIC engine because vehicular components are tuned for optimal function at a torque pulse frequency of the crankshaft at full displacement. For example, the stiffness of engine mounts, seats, steering columns, and floor pans are typically tuned to minimize the NVH excited by the fourth order crankshaft torsional vibration generated by the full displacement operation of eight-cylinder engines. Further, vehicular components normally have natural frequencies less than the torque pulse frequency provided at full displacement operation. However, during reduced displacement operation, the torque pulses increase in magnitude and sufficiently decrease in frequency thereby exciting the natural frequencies of some vehicular components. As a result, NVH levels may rise to unacceptable levels within the vehicle. Such a result is clearly undesirable.

Some airplane piston engines use pendulum vibration absorbers to smooth mean torque output of their crankshafts and reduce stress within the crankshaft and in the drivetrain to the rotating airfoils. These vibrations result from torque pulses exerted by the piston and connecting rod assemblies on the crankshaft. The magnitude of the torsional vibrations is the fluctuation between the maximum torque output and the minimum torque output of the crankshaft. The inertia of the vibration absorbers reduces the maximum torque output and increases the minimum torque output thereby decreasing torsional fluctuations.

Furthermore, most V6, V8, and V10 engines have an inherent first order unbalanced couple that rotates the same direction as the crankshaft. It is common practice to construct the crankshafts of these engines with a large counterweight near the front of the crankshaft, and another large counterweight, diagonally opposite, near the rear end of the crankshaft. The combination of these counterweights generates the appropriate first order couple to cancel the engine's inherent first order unbalanced couple caused by the accelerations of reciprocating masses along the axes of the engine's cylinder bores. Regarding aircraft engines that have pendulum vibration absorbers, typically two vibration absorbers of equal mass are coupled to the crankshaft in the same rotational plane and 180 degrees from each other. As one absorber thrusts upward, the other absorber thrusts downward. In this regard, the pendulum vibration absorbers are balanced on the crankshaft so as to cancel each other's first order balancing forces. Therefore, current pendulum vibration absorbers fail to generate the couple needed to provide first order engine balance.

Moreover, the pendulum vibration absorbers require several parts for attaching to the crankshaft. These parts include pins, bushings, thrust plates, and snap rings. The bushings are fabricated from high strength, wear resistant material for reducing wear between surfaces of the pendulum vibration absorber and the pin. The thrust plate prevents the pin from sliding out of the bushing. Furthermore, the snap ring holds the thrust plate in its position. The incorporation of these several parts increases manufacturing cycle time and costs.

Flywheels also smooth the mean torque output of crankshafts. As one skilled in the art would understand, a conventional flywheel is fixedly engaged to one end of a crankshaft. The inertia of the flywheel opposes torsional fluctuations of the crankshaft. The greater the moment of inertia of the flywheel, the smaller the torsional vibration of the crankshaft. Typically, the inertia of the flywheel may be increased by increasing the size of the flywheel. However, the increased inertia and physical size of the flywheel also typically result in sluggish engine and vehicle acceleration, diminished fuel efficiency, and decreased available space within the vehicle.

The inventors of the present invention have recognized that a need exists to reduce vibrations caused by torsional crankshaft vibrations and first order unbalanced couples within a VDIC engine of an automotive vehicle without sacrificing fuel efficiency and with minimal increase to complexity.

SUMMARY OF INVENTION

The present invention reduces vibrations caused by torsional crankshaft fluctuations and first order unbalanced couples in a variable displacement internal combustion engine (VDIC engine) of an automotive vehicle.

In carrying out the present invention, a crankshaft passively reduces vibrations to an acceptable range for permitting the operation of the VDIC engine at reduced displacements.

There is disclosed herein a crankshaft assembly for a VDIC engine of an automotive vehicle. The crankshaft assembly includes a crankshaft integrated within an internal combustion engine. The crankshaft has a first portion with a first pendulum vibration absorber assembly integrated therein and a second portion with a second pendulum vibration assembly absorber integrated therein. The first portion is offset from the second portion along an axis of the crankshaft. Each absorber assembly includes a counterweight member integrally formed within the crankshaft. The counterweight members have a desired counterweight mass that contributes to first order engine balance. Furthermore, each counterweight member has a pendulum vibration absorber pivotally coupled thereto. The pendulum vibration absorbers have a desired mass and geometry for providing a torsional vibration cancellation as well as first order engine balance.

Two advantages of the present invention are the reduction of vibrations caused by torsional fluctuations and the balance of the inherent first order couple within a VDIC engine of a vehicle. Another advantage of the present invention is that the vibrations are reduced passively without the need for complex timing mechanisms and additional drive shafts. Yet another advantage of the present invention is the efficient use of space within the VDIC engine. Still another advantage of the present invention is the reduction of couplings used to fasten the pendulum vibration absorber to the counterweight member. Yet another advantage of the present invention is that because vibration during less than full cylinder operation is reduced, the operating range over which less than full cylinder operation can be used, without excessive NVH, is increased. By increasing the range over which less than full cylinder operation can be employed leads to an increase in fuel efficiency.

Other advantages of the present invention will become apparent when viewed in light of the detailed description of the preferred embodiment when taken in conjunction with the attached drawings and appended claims.

BRIEF DESCRIPTION OF DRAWINGS

FIG. 6A is an axial view of a pendulum insert according to a preferred embodiment of the invention;

FIG. 6B is a cross-sectional view of the pendulum insert in FIG. 6A, taken along line 6B—6B;

DETAILED DESCRIPTION

Figure 1:
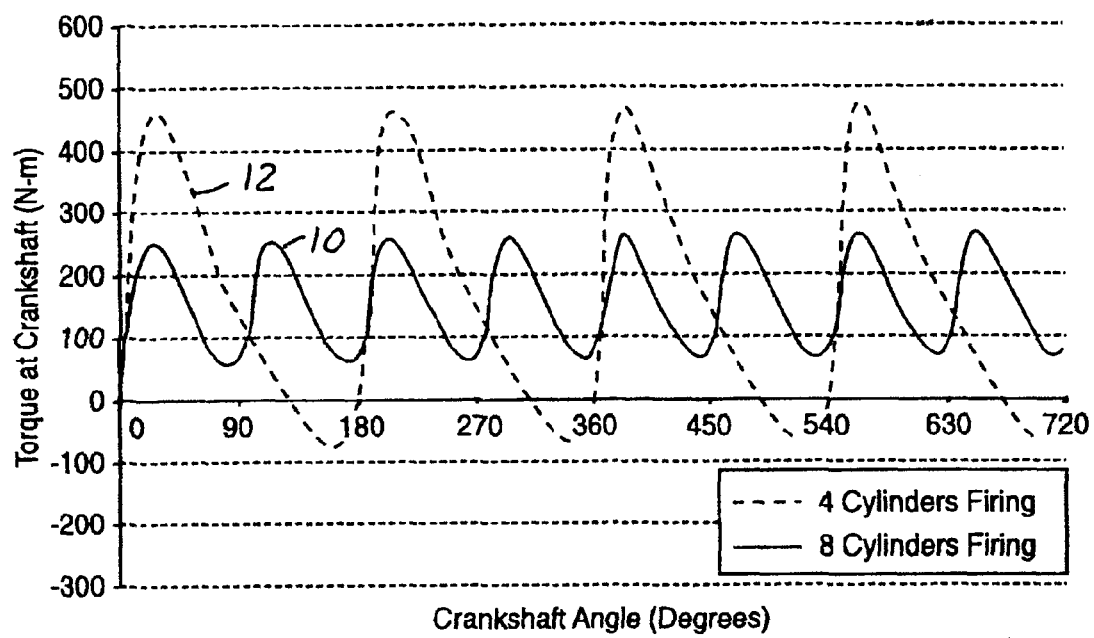
FIG. 1 is a graph of crankshaft torque output of an eight-cylinder VDIC engine operating during a full displacement mode and a reduced displacement mode.

In the following figures, the same reference numerals are used to identify the same components in the various views.

Figure 2:
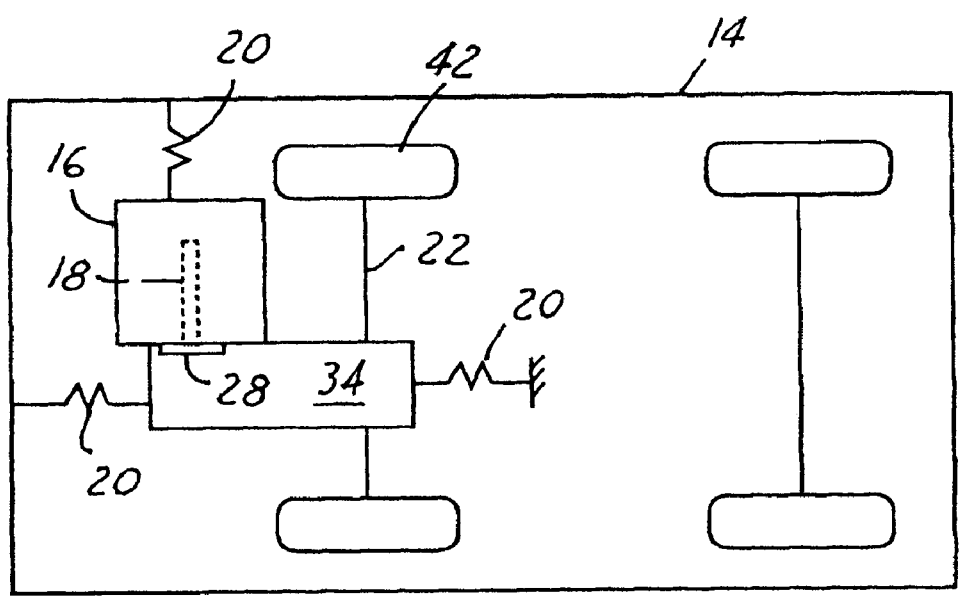
FIG. 2 is a schematic view of an automotive vehicle according to a preferred embodiment of the present invention.

Referring to FIG. 2, there is shown an automotive vehicle 14 having an engine 16. The engine 16 is secured to the vehicle 14 by a plurality of engine mounts 20. The engine 16 has a plurality of cylinders integrally formed therein. Within each cylinder, there is a piston that reciprocates during operation of the engine 16. The pistons are coupled to a crankshaft assembly 18 via connecting rod members. The crankshaft assembly 18 is engaged to a flywheel 28, which is contained within a housing for a transaxle 34. The transaxle 34 is also attached to the vehicle by way of the engine mounts 20. The transaxle 34 receives power from the flywheel 28 and delivers power through an axle 22 to the wheels 42 of the vehicle 14.

Figure 3:
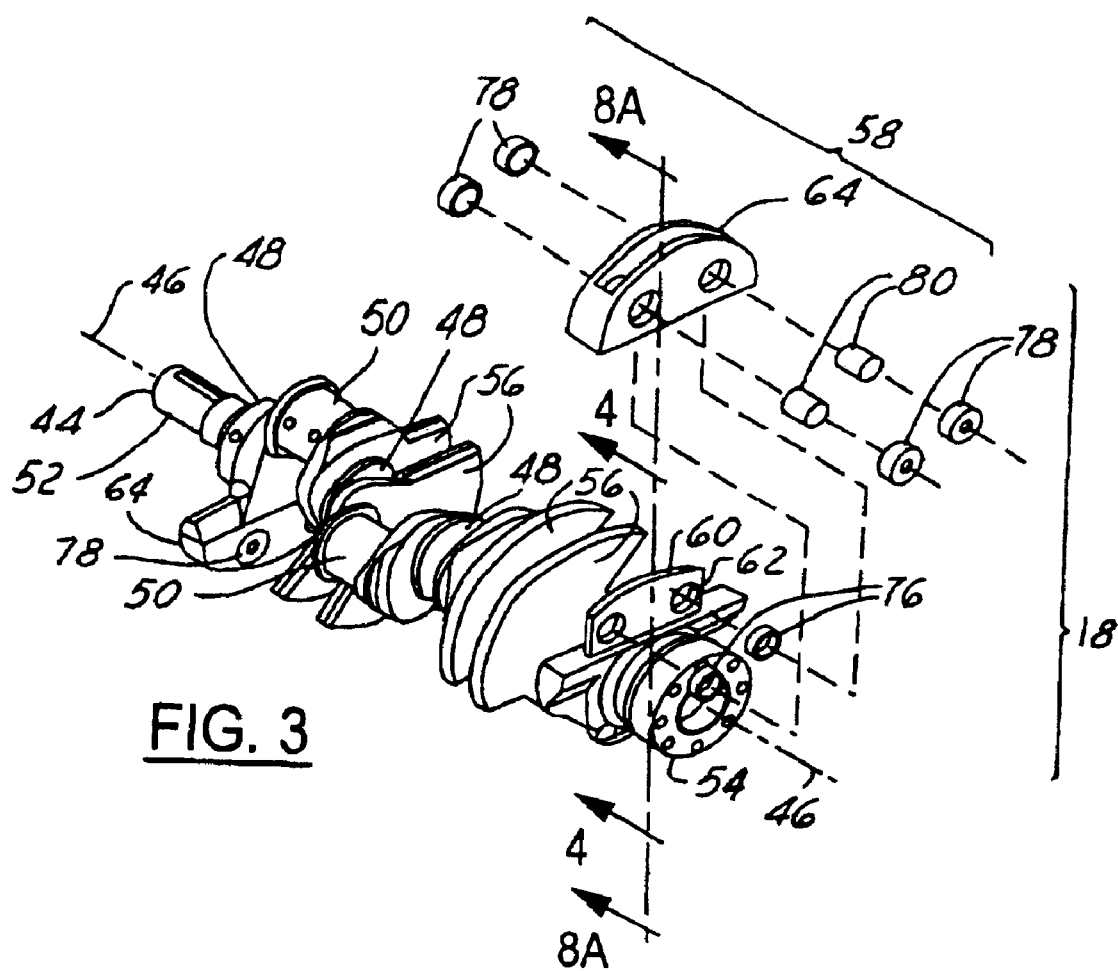
FIG. 3 is an exploded perspective view of a crankshaft assembly for a variable displacement internal combustion engine of an automotive vehicle according to a preferred embodiment of the invention.

Referring now to FIG. 3, there is illustrated an exploded perspective view of a crankshaft assembly 18 for an engine 16 of an automotive vehicle 14 according to a preferred embodiment of the present invention.

The crankshaft assembly 18 includes a conventional crankshaft 44 having a rotational axis 46. The crankshaft 44 is rotated about its rotational axis 46 on a plurality of main journals 48 integrally formed within the crankshaft 44. As one skilled in the art would understand, each main journal 48 is rotatably coupled to a main bearing of engine 16 thereby rotatably coupling the crankshaft 44 to engine 16.

The crankshaft 44 also includes a plurality of rod journals 50 integrally formed therein. It is also known in the art that each rod journal 50 has a rod bearing rotatably coupled thereto for permitting a reciprocating piston and connecting rod member to drive the crankshaft 44 in its rotational motion.

The crankshaft 44 has a front end and a back end. The front end typically has a snout 52 extending therefrom. The snout 52 normally provides a mounting place for a camshaft drive mechanism, a front damper, and one or more fan belt pulleys. The back end has a flange 54 integrally formed therein. As is known in the art, the flange 54 is typically coupled to a flywheel 28 for operatively engaging the crankshaft 44 to the transaxle 34. The flywheel 28 also assists in smoothing torsional fluctuations in the crankshaft 44.

Furthermore, the crankshaft 44 typically includes at least one counterweight 56 integrally formed therein. A conventional engine typically includes one or more counterweights 56 for balancing the motion of the piston and connecting rod assemblies within engine 16. A conventional crankshaft's counterweights 56 are integrally attached to the crankshaft 44, and have the appropriate masses and locations to generate forces on the crankshaft 44 that cancel the first order forces and couples imposed upon the crankshaft 44 by the acceleration forces acting on the engine's piston and connecting rod assemblies. First order forces and couples refer to the forces and couples that vary as a sinusoidal function, with one cycle of force occurring with each rotation of the crankshaft 44. Any piston and connecting rod assembly acceleration force that is not cancelled internally to the engine causes motion of the engine assembly and is transmitted through the engine mounts 20 to the structure of the vehicle 14.

Figure 8A:
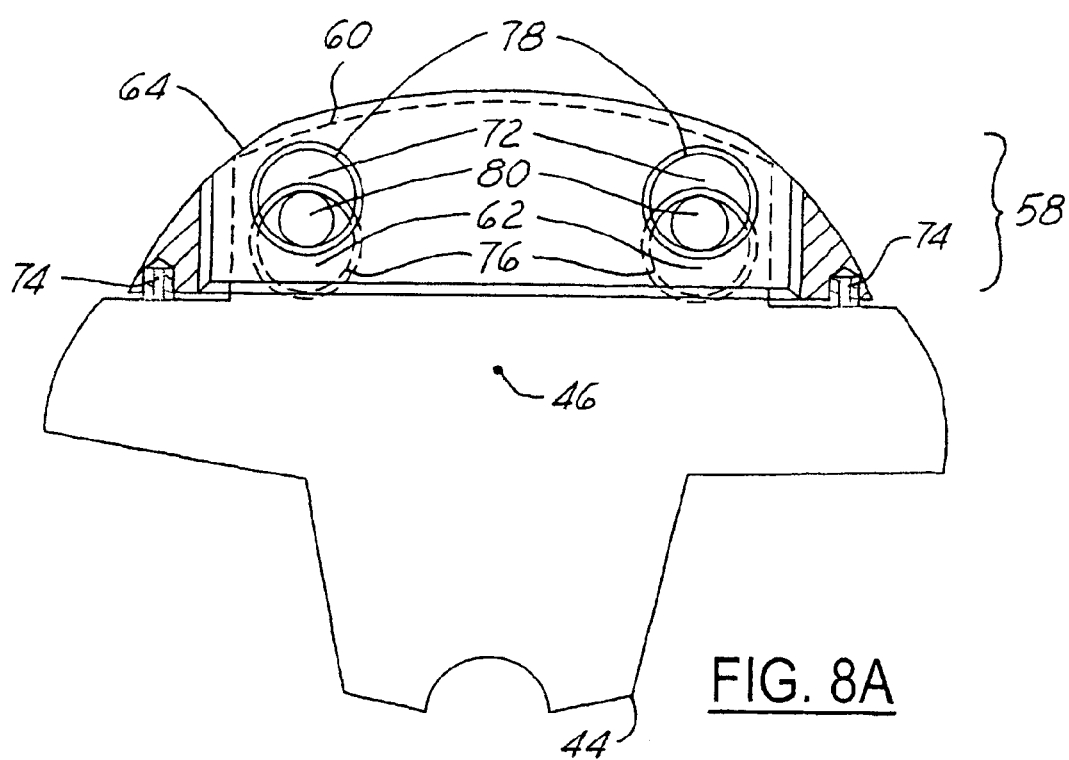
FIG. 8A is a cross-sectional view of the pendulum vibration absorber assembly in steady rotation, taken along line 8A—8A of FIG. 3.
Figure 8B:
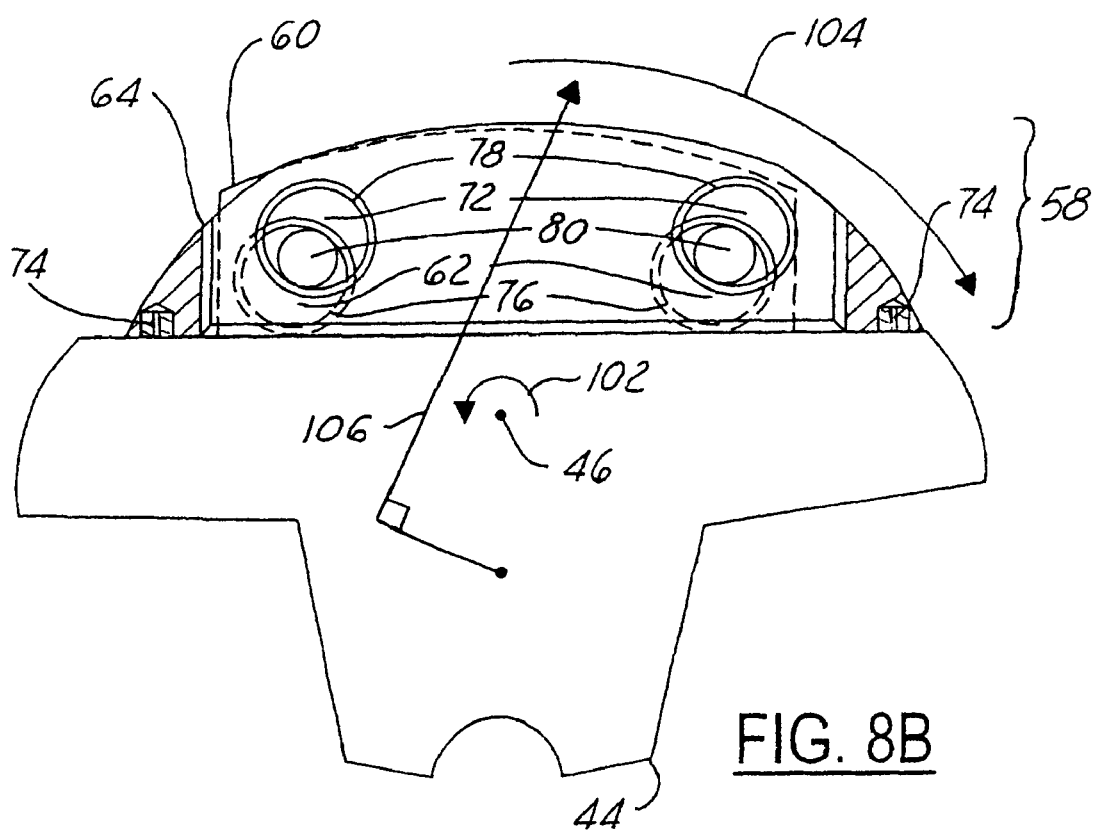
FIG. 8B is a cross-sectional view of the pendulum vibration absorber assembly opposing a counterclockwise acceleration, taken along line 8A—8A of FIG. 3.
Figure 8C:
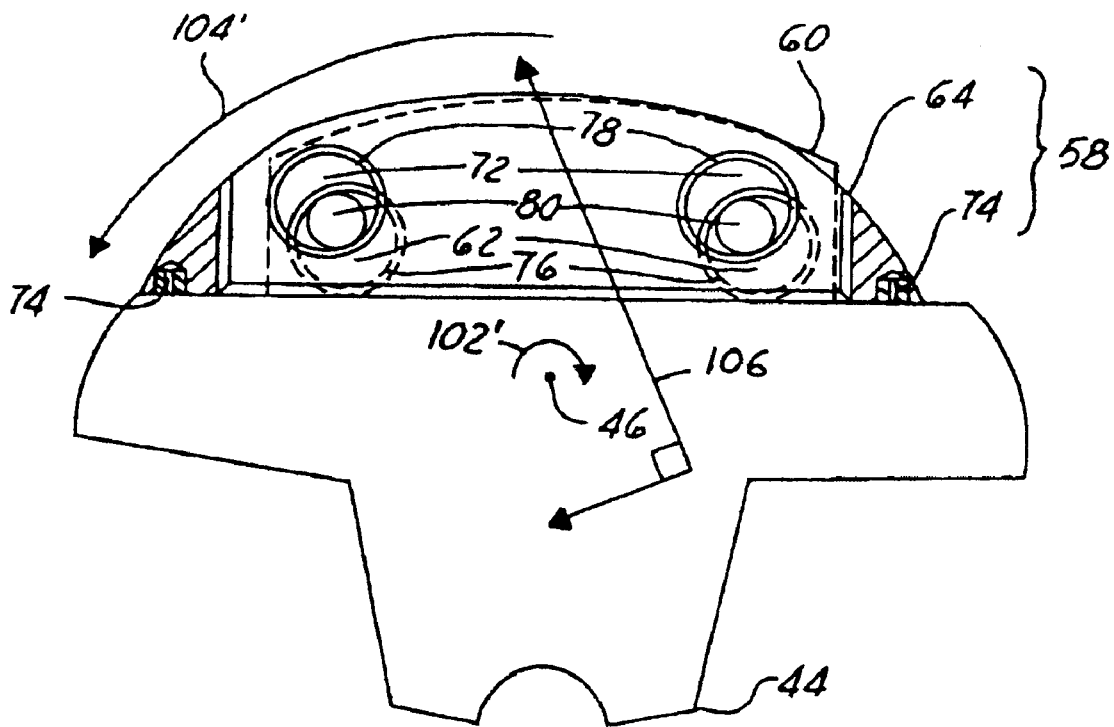
FIG. 8C is a cross-sectional view of the crankshaft assembly opposing a clockwise acceleration, taken along line 8A—8A of FIG. 3.

According to the present invention, crankshaft assembly 18 includes a pendulum vibration absorber assembly 58 (best shown in FIGS. 8A, 8B, and 8C). The pendulum vibration absorber assembly 58 (absorber assembly) provides first order balance to engine 16 in the same manner as do the counterweights 56. Preferably, at least two absorber assemblies 58 are incorporated within the crankshaft assembly 18. The absorber assemblies 58 are positioned on the crankshaft 44 to oppose first order unbalanced forces and unbalanced couples produced by reciprocating piston and connecting rod assemblies. For example, an absorber assembly 58 is preferably integrated within the crankshaft 44 in a rotational plane adjacent to the rotational plane of a rod journal. Furthermore, the absorber assembly 58 is preferably integrated within the crankshaft 44 at a position 180 degrees from the rod journal. In this regard, as a piston and connecting rod assembly forces the rod journal 50 downward, the absorber assembly 58 is thrust upward. The absorber assembly 58 reduces the downward force on the engine mounts 20 thereby reducing a first order force transmitted to the vehicle structure through the engine mounts 20.

On the other hand, as one skilled in the art would understand, placement of two absorber assemblies 58 in the same or adjacent rotational planes at positions 180 degrees from each other may balance the absorber assemblies 58 on the crankshaft 44 so as to cancel each others' first order balancing forces. Therefore, the absorber assemblies 58 are preferably offset from each other to prevent cancellation of each other's balancing forces and to provide first order engine balance, in addition to torsional fluctuation attenuation.

Figure 4:
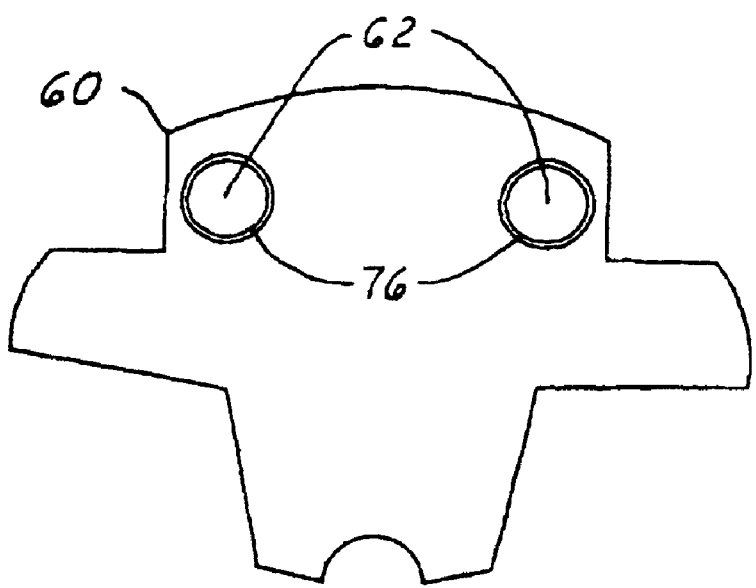
FIG. 4 is a cross-sectional view of the crankshaft taken along line 4—4 of FIG. 3.

FIG. 4 is a cross-sectional view of the crankshaft 44 taken along line 4—4 of FIG. 3. The counterweight member 60 typically extends from crankshaft 44 in a plane perpendicular to the rotational axis 46 of crankshaft 44 and has at least one aperture 62 integrally formed therein. Preferably, the counterweight member 60 has two circular apertures 62 integrally formed therein for mounting a pendulum 64 thereto.

Figure 5A:
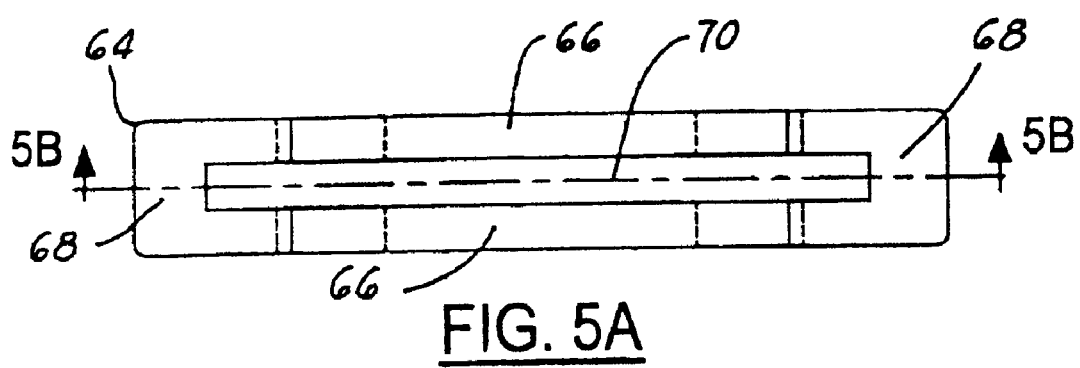
FIG. 5A is a top view of a pendulum vibration absorber according to a preferred embodiment of the present invention.
Figure 5B:
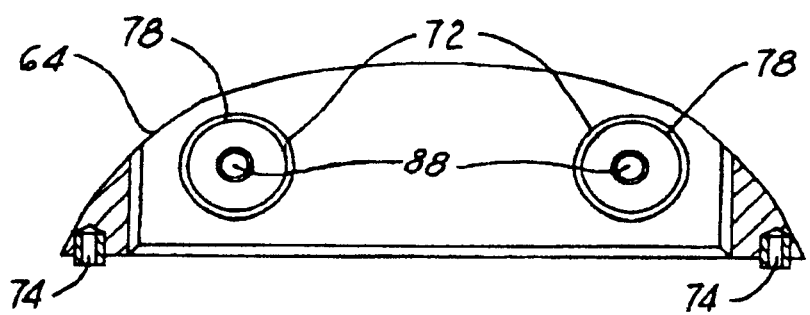
FIG. 5B is a cross-sectional view of the pendulum vibration absorber shown in FIG. 5A, taken along line 5B—5B.

Referring back to FIG. 3, the absorber assembly 58 further includes a pendulum 64 pivotally coupled to the counterweight member 60 in manner that allows for a limited range of free movement between the counterweight member 60 and the pendulum 64. FIGS. 5A and 5B best illustrate the pendulum 64.

Turning to FIG. 5A, a top view of the pendulum 64 is illustrated according to a preferred embodiment of the present invention. The pendulum 64 preferably includes opposing plates 66 fixedly coupled to each other through a pair of integral spacers 68. A slot 70 is disposed between the plates 66 for receiving the counterweight member 60.

Turning now to FIG. 5B, there is shown a cross-sectional side view of the pendulum 64 in FIG. 5A, taken along line 5B—5B. Each plate 66 has at least one hole 72 integrally formed therein. A center of the hole 72 on one plate 66 is aligned with a center of another hole 72 on the other plate 66. Preferably, each plate 66 has two circular holes 72 integrally formed therein.

Furthermore, the pendulum 64 preferably has at least one snubber 74 coupled thereto for cushioning contact, and subsequently preventing noise, between the pendulum 64 and the crankshaft 44 during start up and shut down of the VDIC engine 16. The snubber 74 is preferably made of rubber material and may alternatively be composed of other materials as desired.

Referring back to FIG. 3, the counterweight member 60 is disposed in the slot 70 of the pendulum 64. Each aperture 62 of the counterweight member 60 has a counterweight bushing 76, preferably of hardened wear resistant material, coupled thereto by a press fit. Likewise, each hole 72 of the pendulum 64 has a pendulum insert 78 coupled thereto by a press fit. The pendulum 64 is pivotally coupled to the counterweight member 60 by a pin 80 disposed within each counterweight bushing 76 and the pair of pendulum inserts 78.

Referring now to FIGS. 6A and 6B, the pendulum insert 78 is illustrated according to the preferred embodiment of the present invention. FIG. 6A shows an axial view of the pendulum insert 82. In general, an outer surface 82 of the pendulum insert 82 is similarly shaped to the hole 72 in the pendulum 64. For example, a circular outer surface 82 of the pendulum insert 82 is engaged to a circular hole 72. The outer surface 82 is typically sized slightly larger than the hole 72 so as to allow for a press fit.

FIG. 6B shows a cross-sectional view of the pendulum insert 82 in FIG. 6A, taken along line 6B—6B. An inner surface 84 of the pendulum insert 82 serves as a bushing to prevent wear on the pendulum 64. Similarly, an inner surface of the counterweight bushing 76, shown in FIG. 3, serves as a bushing to prevent wear on the counterweight member 60. The pendulum insert 82 also includes a retaining wall 86 integrally formed therein. The retaining wall 86 prevents the pin 80 from sliding out of the pendulum hole 72 and the counterweight aperture 62. Furthermore, the retaining wall 86 has a lubricant opening 88 integrally formed therein for permitting lubricant to reach surfaces of the counterweight bushing 76, the pendulum insert 82, and the pin 80. The lubricant may reduce wear of the entire absorber assembly 58 and reduce friction of the load carrying parts 76, 80, and 84 to improve tuning performance. Although FIGS. 6A and 6B illustrate the outer surface 82 and inner surface 84 as circular in form, it is clear that the inner surface 84 may also be non-circular as desired to improve tuning performance. If properly clocked in position, the non-circular inner surface 84 can improve tuning to enable a given mass to be more effective at reducing torque fluctuations.

The pin 80 has a cross-sectional diameter that is smaller than an inner diameter of the pendulum insert 82 and an inner diameter of the counterweight bushing 80 so as to allow a limited range of free movement between the pendulum 64 and the counterweight member 60. The pendulum insert 82 and the counterweight bushing 76 prevent wear on counterweight member 60 and pendulum 64. The diameter of the opening 88 is smaller than the diameter of the pin 80 so as to retain the pin 80 within the pendulum hole 72 and the counterweight aperture 62.

The absorber assembly 58 reduces vibrations caused by a particular order of crankshaft excitation. An order of crankshaft excitation typically depends upon the number of torque pulses exerted on the crankshaft 44 per 360 degrees of revolution. A torque pulse is exerted on the crankshaft 44 each time a cylinder fires. With regard to four stroke engines 16, each cylinder of engine 16 fires one time for every 720 degree revolution of the crankshaft 44. The number of torque pulses delivered to the crankshaft 44 every 360 degree revolution is the principal order of crankshaft excitation.

For example, an eight-cylinder VDIC engine operating in full displacement mode exerts eight torque pulses over a 720 degree revolution of the crankshaft 44 (an example of which is curve 10 in FIG. 1). Thus, the crankshaft 44 receives four torque pulses for each 360 degree revolution resulting in crankshaft excitation to the fourth order.

The same eight cylinder VDIC engine may operate in a reduced displacement mode whereby four of its cylinders are disabled (an example of which is curve 12 in FIG. 1). Thus, the engine 16 would operate on four cylinders delivering two torque pulses to the crankshaft 44 every 360 degree revolution. Such torque pulse frequency results in a crankshaft torsional excitation of second order.

The absorber assembly 58 may be manufactured to attenuate torsional fluctuations for a particular order of crankshaft excitation without affecting mean torque output or other orders of crankshaft excitation. The following equation exemplifies how the absorber assembly 58 may be dimensioned to attenuate torsional fluctuations at a particular order of crankshaft excitation:

$$n = (R/r)^{1/2}$$

Where:

$d_1$=diameter of counterweight apertures and pendulum holes $d_2$=diameter of pins $r = d_1 - d_2$ R+r=distance between the rotational axis and the center of mass of the pendulum n=tuning order Constructing the absorber assemblies 58 in this manner allows the pendulums 64 to establish resonant harmonic motion that corresponds in frequency to the exciting vibrational frequency imposed upon the crankshaft 44.

As is the nature of any tuned vibration absorber, the pendulums 64 passively move with the appropriate amplitude and phase relationship to oppose the exciting vibration.

The operation of the present invention is best understood having a preliminary understanding of the circumstances giving rise to the need for attenuation of vibrational torque output. If engine 16 operates with some of the cylinders deactivated, i.e., in a reduced displacement mode, fuel efficiency is improved. In engines in which torque delivery by the engine is controlled by adjusting a throttle, the amount of loss due to pumping losses across the throttle increases at lighter loads when the amount of throttling is greater. Thus, higher efficiency results when operating a smaller number of cylinders at a higher load per cylinder than with all cylinder operation at a light load per cylinder. Reduced displacement mode can be used when the four-cylinders can provide the desired torque. Clearly, fuel efficiency is increased over the operating cycle if engine 16 operates in reduced displacement mode over as much of the operating cycle as practicable. A typical limitation to operating in reduced displacement mode is that at low engine speed with high load results in unacceptable vehicle NVH. Thus, even though the engine 16 could provide the desired torque by operating a subset of the cylinders, NVH constraints dictate operating the full set of cylinders, thereby giving up some potential fuel economy gains. NVH interferes with exploiting the fuel economy potential of the VDIC engine.

Disabling of cylinders reduces torque pulse frequency. This reduction may result in a sufficiently low torque pulse frequency so as to excite the natural frequencies of major body modes. A sufficiently low torque pulse frequency typically occurs during idle speed operation during the reduced displacement mode. Consequently, the lowered torque pulse frequency results in vibrations within vehicle 14. These vibrations are exacerbated when the engine load is increased during idle speed operation at the reduced displacement mode. For example, vibrations may be most prevalent where the engine 16 idles in reduced displacement mode while simultaneously experiencing loads from an A/C compressor, alternator, torque converter, and power steering pump.

To satisfy driver demand, engine 16 provides a particular torque output. A torque output at the crankshaft 44 is based upon the frequency and magnitude of the torque pulses delivered by the cylinders to crankshaft 44. Solid curve 10 in FIG. 1 is an example for an eight-cylinder engine with all cylinders firing. Dashed curve 12 in FIG. 1 is for the eight-cylinder engine operating in the reduced displacement mode with four cylinders firing. The torque pulses for four-cylinder operation are greater than those for eight-cylinder operation so that four-cylinder mode provides equal mean torque output of eight-cylinder mode. Four-cylinder mode 12 shows that the crankshaft undergoes torque reversals, that is, oscillations between positive and negative output torques. Whereas, eight-cylinder mode 10 indicates torque remaining positive. These data are indicative of prior art engines without absorber assemblies.

Figure 7A:
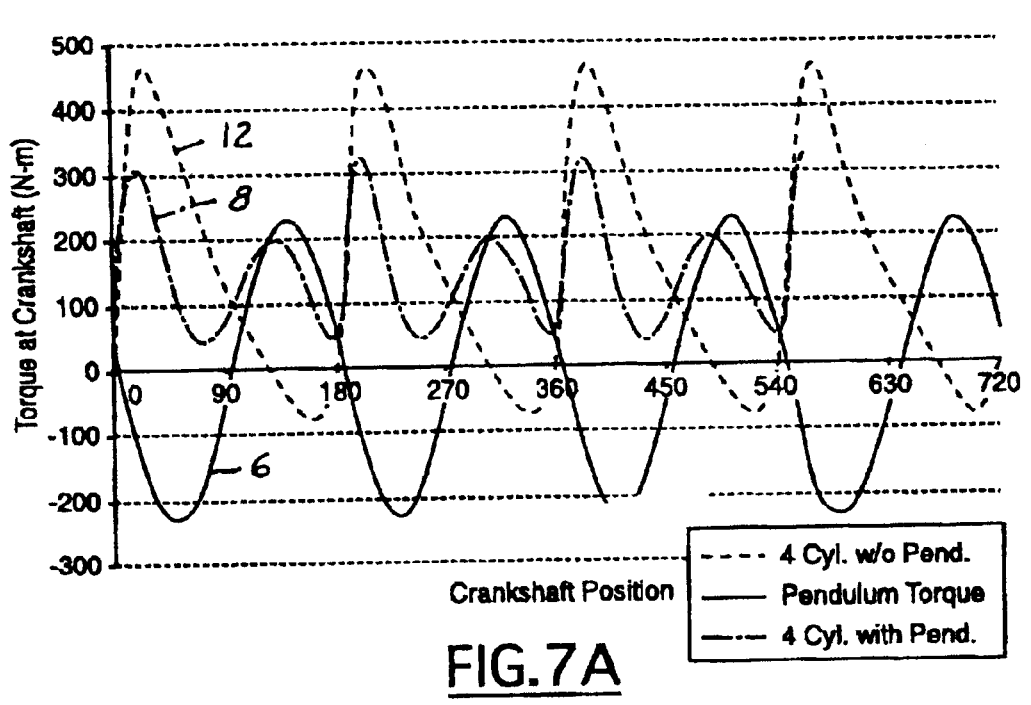
FIG. 7A is a graph of crankshaft torque output of an eight-cylinder VDIC engine operating during a reduced displacement mode, specifically, in four-cylinder mode showing a torque output without a pendulum vibration absorber and with a pendulum vibration absorber, also shown is the torque contribution of the pendulum vibration absorber itself.

The four-cylinder mode is shown again as dashed curve 12 in FIG. 7A. Also shown in FIG. 7A is the torque applied by an absorber assembly 58, according to the present invention, as solid curve 6. The sum of dashed curve 12, i.e., the torque output of four-cylinder operation without a pendulum 64, and solid curve 6, the torque output of the absorber assembly 58 gives the resultant torque output of four-cylinder torque output according to the present invention. This is shown as dash-dot curve 8 in FIG. 7A, i.e., for an engine 16 with pendulum vibration absorption according to the present invention. Both curves 12 and 8 indicate that the mean torque output at the crankshaft 44 is the same for the two cases. However, curve 8 (with an absorber assembly 58) shows that the peaks and valleys of the torque pulses are attenuated. Furthermore, with the absorber assembly 58, the torque output does not exhibit torque reversals, i.e., curve 8 remains positive throughout the cycle.

Figure 7B:
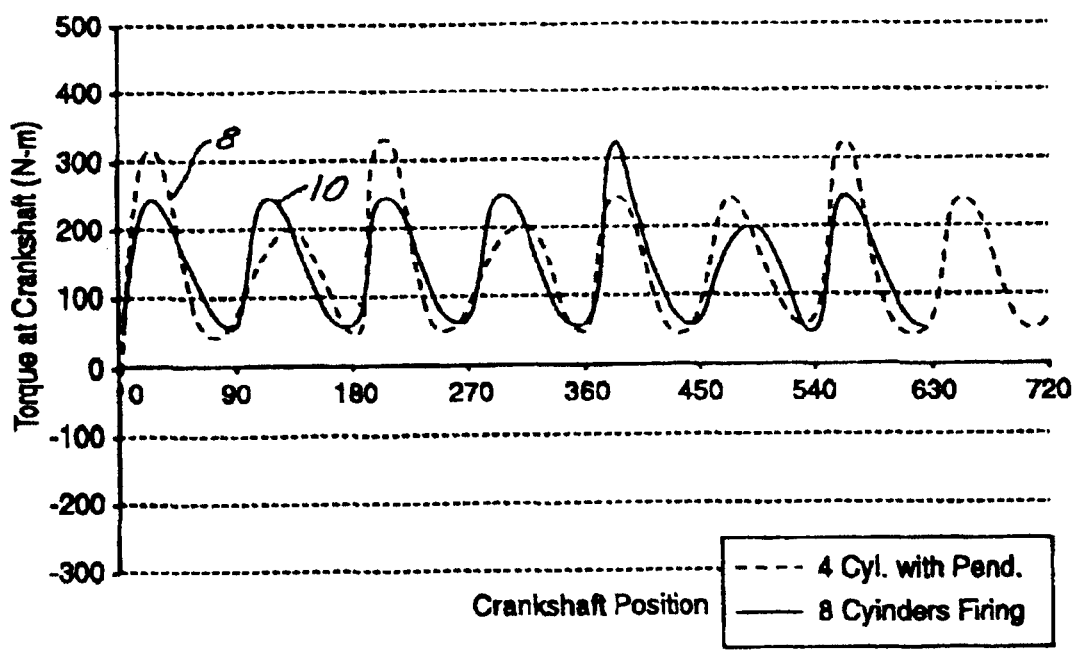
FIG. 7B is a graph of crankshaft torque output of an eight-cylinder VDIC engine operating during full displacement mode and reduced displacement mode with benefit of a pendulum vibration absorber.

A comparison of the original full displacement mode (curve 10 of FIG. 1) and the reduced displacement mode with an absorber assembly 58 (curve 8 of FIG. 7A) is shown in FIG. 7B.

Referring now to FIG. 8A, there is illustrated a cross-sectional view of the crankshaft assembly 18 in steady rotation, taken along line 8A—8A in FIG. 3. When the VDIC engine 16 is in operation, the reciprocating pistons and connecting rods (not shown) apply torque pulses to the crankshaft 44 so as to rotate the crankshaft 44 about its rotational axis 46. As the crankshaft assembly 18 rotates, centrifugal acceleration tends to force a center of mass of the pendulum 64 in its farthest position from the rotational axis 46 of the crankshaft 44. The pendulum 64 typically remains in this position during steady rotation of the crankshaft 44. Steady rotation requires approximately zero angular acceleration of the crankshaft 44.

An angular acceleration of the crankshaft 44 in a first direction causes the pendulum 64 to rock in a second direction opposite to the first direction. The pendulum 64 is coupled to the counterweight member 60 of the crankshaft 44 (as detailed in the descriptions for FIGS. 6A and 6B, paragraph [0048]). This engagement permits a limited range of free movement between the pendulum 64 and the crankshaft 44. The absorber assembly 58 has an appropriate mass and construction geometry for attenuating a maximum second order vibration torque output. Second order crankshaft vibration causes the pendulum 64 to rock in a direction opposite to the direction of the crankshaft acceleration. The effective inertia of the pendulum 64 tends to cause the crankshaft assembly 18 to retain a constant speed. In doing so, the pendulum 64 operatively absorbs crankshaft acceleration and passively reduces a torsional second order vibration of the crankshaft 44.

As illustrated in FIG. 8B, an acceleration of the crankshaft 44 in a counterclockwise direction 102 causes the pendulum 64 to passively rock in a clockwise direction 104 relative to the crankshaft 44. As the pendulum 64 moves in such direction, it remains attached to the crankshaft 44 typically through the pin 80, the inserts 82, 84, and the counterweight member 60. As applied through the pin 80, inserts 82, 84 and the counterweight member 60, the force generated by the effective inertia of the pendulum 64 passively produces a balancing torque 106 on the crankshaft 44 in opposition to the acceleration. Consequently, the pendulum 64 passively attenuates the magnitude of acceleration in the counterclockwise direction 102.

Referring now to FIG. 8C, a clockwise acceleration 86 of the crankshaft 44 results in a similar torsional vibration cancellation detailed in the description for FIG. 8B. Angular crankshaft acceleration in a clockwise direction 102' causes the pendulum 64 to rock in a counterclockwise direction 104' relative to the crankshaft 44. As the pendulum 64 moves in such direction, the inertia of the pendulum 64 passively produces a balancing torque 106 on the crankshaft 44 in opposition to the acceleration. Thus, the pendulum 64 passively reduces the magnitude of the acceleration in the clockwise direction 102'.

More than one order of crankshaft excitation may be attenuated as long as the crankshaft 44 has an equal or larger number of absorber assemblies 58 formed therein, with each assembly 58 tuned to the desired order of excitation. For example, a VDIC engine 14 that generates vibrational torque output during both eight cylinder operation and four cylinder operation would benefit from one or more absorber assembly 58 tuned to the fourth order and one or more absorber assembly 58 tuned to the second order. The above example discussed is an eight cylinder engine in half of the cylinders are deactivated. However, the present invention applies to any multicylinder engine with any number of deactivated cylinders because the present invention provides for reducing any crankshaft order torque fluctuation by an appropriately tuned pendulum system.

The pendulum 64 has an appropriate mass and geometry of construction enabling the pendulum 64 to attenuate the second order vibration torque output of the crankshaft 44. As a general rule, the greater the mass, the greater the vibrational torque output attenuated by pendulum 64.

Further, the pendulum 64 is preferably composed of tungsten and alternatively may be composed of a high density material such as iron, steel, or other suitable material. A pendulum 64 composed of tungsten has a greater mass than a pendulum 64 composed of iron. Therefore, a tungsten pendulum 64 is capable of attenuating a larger vibrational torque output. Of course, the pendulum 64 may be composed of other kinds of material as desired.

Figure 9:
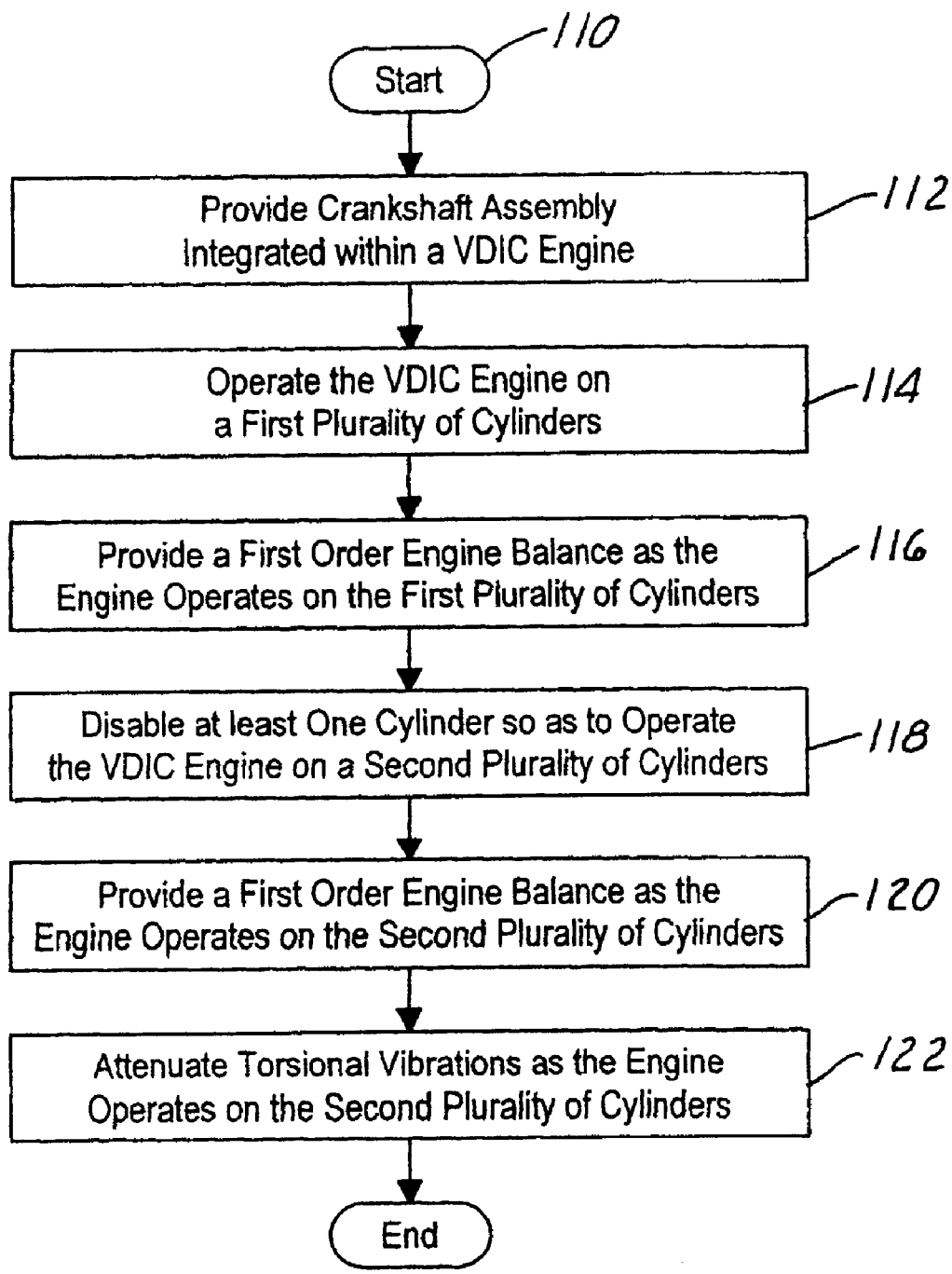
FIG. 9 is a flowchart of a method for operating a variable displacement engine with a crankshaft assembly integrated therein according to a preferred embodiment of the invention.

Referring now to FIG. 9, there is shown a flowchart depicting a method for operating a VDIC engine 16 according to a preferred embodiment of the present invention. The sequence is initiated in step 110 and immediately proceeds to step 112.

In step 112, a crankshaft assembly 18 as described above is provided within a VDIC engine 16. The absorber assemblies 58 are preferably positioned within the crankshaft to cancel first order forces and unbalanced couples generated by reciprocating piston and connecting rod assemblies. Also, the absorber assemblies 58 are preferably offset from each other along the axis 46 of the crankshaft 44 to prevent cancellation of each other's first order balancing forces. Then, the sequence proceeds to step 114.

In step 114, the VDIC engine 16 is operated on a first plurality of cylinders. For example, an eight-cylinder VDIC engine 16 may operate at full displacement on all eight cylinders. Then, the sequence continues to step 116.

In step 116, the absorber assemblies 58 provide a first order engine balance while the VDIC engine operates on the first plurality of cylinders. This step requires the absorber assemblies 58 to be positioned on the crankshaft 44 in such a manner that they produce first order balancing forces and couples in opposition to the first order forces and couples generated by reciprocating piston and connecting rod assemblies. For example, a absorber assembly 58 may be integrated within the crankshaft 44 within a rotational plane adjacent to the rotational plane of a rod journal 50, with the absorber assembly 58 positioned 180 degrees from the rod journal 50. As the piston and connecting rod assembly accelerate downward, the absorber assembly thrusts upward thereby canceling first order forces created by the piston and connecting rod assembly. Attenuation of first order vibrations is further detailed in the description for FIG. 3, paragraphs [0041] and [0045]. The sequence then proceeds to step 118.

In step 118, at least one cylinder of the VDIC engine 16 is disabled so as to operate the engine 16 on a second plurality of cylinders. For example, an eight-cylinder VDIC engine 16 operating on all eight cylinders may disable four of its cylinders and continue operation on the four remaining cylinders. As mentioned above, operating the engine on a subset of cylinders can improve fuel economy without sacrificing necessary power. Then, the sequence proceeds to step 120.

In step 120, the absorber assemblies 58 continue to provide first order engine balance while the VDIC engine 16 is operating on the second plurality of cylinders. In accordance with the previous example, the absorber assemblies 58 continue to reduce first order vibrations while the engine 16 operates on the subset of four cylinders. The sequence then proceeds to step 122.

In step 122, the absorber assemblies 58 attenuate torsional fluctuations while the VDIC engine 16 operates on the second plurality of cylinders. As detailed in the description for FIG. 1, torsional fluctuations are produced by the fluctuation between the maximum torque output and minimum torque output at a particular mean torque output. The absorber assemblies 58 are tuned to oppose crankshaft acceleration at a particular order of crankshaft excitation that results from operating the engine on the second plurality of cylinders. For instance, the absorber assemblies 58 may be tuned to the second order to oppose crankshaft accelerations while the engine 16 operates on four cylinders. By opposing crankshaft acceleration, the pendulums 64 decrease torsional fluctuations which ultimately produce vibrations in the vehicle structure.

While particular embodiments of the invention have been shown and described, numerous variations and alternate embodiments will occur to those skilled in the art. Accordingly, it is intended that the invention be limited only in terms of the appended claims.

What is claimed is:

1. A crankshaft assembly comprising:
   a crankshaft integrated within an internal combustion engine;
   a first pendulum vibration absorber assembly integrated within a first end portion of said crankcraft;
   a second pendulum vibration absorber assembly integrated within a second end portion of said crankshaft, said first pendulum vibration absorber assembly and said second vibration absorber assembly each including a counterweight integrally formed within said crankshaft and a pendulum coupled to said counterweight, said counterweight having a desired counterweight mass for providing a first order engine balance, said pendulum having a desired pendulum mass for providing said first order engine balance, said pendulum having a desired pendulum geometry and said desired pendulum mass for attenuating a torsional fluctuation in said crankshaft;
   at least one pin for coupling said pendulum to said counterweight; and
   at least one pendulum insert coupled to said pendulum, said at least one pendulum insert having a pendulum bushing portion and a retaining wall portion extending generally perpendicularly from said pendulum bushing portion, said retaining wall portion for retaining said at least one pin within said pendulum and said counterweight, said pendulum bushing portion for decreasing wear on said pendulum.

2. The crankshaft assembly of claim 1 wherein said pendulum has at least one aperture formed therein for receiving said at least one pendulum insert.

3. The crankshaft assembly of claim 2 wherein said pendulum bushing portion has an outer surface sized to a predetermined outer diameter for engaging said pendulum insert to said pendulum within said at least one aperture of said pendulum.

4. The crankshaft assembly of claim 2 wherein said pendulum bushing portion has an inner surface sized to a predetermined inner diameter for receiving said at least one pin, said at least one pin having a pin diameter sized smaller than said predetermined inner diameter of said pendulum bushing portion.

5. The crankshaft assembly of claim 4 wherein said counterweight has at least one hole formed therein for receiving a counterweight bushing.

6. The crankhaft assembly of claim 5 wherein said retaining wall portion has a lubricant opening formed therein for allowing a lubricant to pass therethrough and lubricate said at least one pin, said counterweight bushing, and said pendulum bushing portion of said at least one pendulum insert.

7. The crankshaft assembly of claim 1 wherein said first pendulum vibration absorber assembly is positioned on said crankshaft diametrically opposite to said second pendulum vibration absorber assembly, said first pendulum vibration absorber assembly and said second pendulum vibration absorber assembly intended to generate a first order balancing couple for canceling an inherent first order unbalanced couple.

8. An engine system comprising:
   a variable displacement engine that operates on a first plurality of cylinders and a second plurality of cylinders that is less in quantity than said first plurality of cylinders;
   a crankshaft integrated within said variable displacement engine;
   a first pendulum vibration absorber assembly integrated within a first end portion of said crankshaft;
   a second pendulum vibration absorber assembly integrated within a second end portion of said crankshaft, said first pendulum vibration absorber assembly and said second vibration absorber assembly each including a counterweight integrally formed within said crankshaft and a pendulum coupled to said counterweight, said counterweight having a desired counterweight mass for providing a first order engine balance, said pendulum having a desired pendulum mass for providing said first order engine balance, said pendulum having a desired pendulum geometry and said desired pendulum mass for attenuating a torsional fluctuation in said crankshaft when said variable displacement engine operates on said second plurality of cylinders;
   at least one pin for coupling said pendulum to said counterweight; and
   at least one pendulum insert coupled to said pendulum, said at least one pendulum insert having a pendulum bushing portion and a retaining wall portion extending generally perpendicularly from said pendulum bushing portion, said retaining wall portion for retaining said at least one pin within said pendulum and said counterweight, said pendulum bushing portion for decreasing wear on said pendulum.

9. The crankshaft assembly of claim 8 wherein said second plurality of cylinders is a half quantity of said first plurality of cylinders.

10. The crankshaft assembly of claim 9 wherein said pendulum has at least one aperture formed therein for receiving said at least one pendulum insert.

11. The crankshaft assembly of claim 10 wherein said pendulum bushing portion has an outer surface sized to a predetermined outer diameter for engaging said pendulum insert to said pendulum within said at least one aperture of said pendulum.

12. The crankshaft assembly of claim 10 wherein said pendulum bushing portion has an inner surface sized to a predetermined inner diameter for receiving said at least one pin, said at least one pin having a pin diameter sized smaller than said predetermined inner diameter of said pendulum bushing portion.

13. The crankshaft assembly of claim 12 wherein said counterweight has at least one hole formed therein for receiving a counterweight bushing.

14. The crankshaft assembly of claim 13 wherein said retaining wall portion has a lubricant opening formed therein for allowing a lubricant to pass therethrough and lubricate said at least one pin, said counterweight bushing, and said pendulum bushing portion of said at least one pendulum insert.

15. The crankshaft assembly of claim 14 wherein said first pendulum vibration absorber assembly is positioned on said crankshaft diametrically opposite to said second pendulum vibration absorber assembly, said first pendulum vibration absorber assembly and said second pendulum vibration absorber assembly intended to generate a first order balancing couple for canceling an inherent first order unbalanced couple.

* * * * *